United States Patent [19]

Mills et al.

[11] 4,407,486
[45] Oct. 4, 1983

[54] METHOD AND APPARATUS OF HOT WORKING METAL WITH INDUCTION REHEATING

[75] Inventors: Gary L. Mills, Monroe; B. Dean Bowen, Matthews, both of N.C.

[73] Assignee: Teledyne Industries, Inc., Monroe, N.C.

[21] Appl. No.: 411,912

[22] Filed: Aug. 26, 1982

Related U.S. Application Data

[62] Division of Ser. No. 197,493, Oct. 16, 1980, Pat. No. 4,362,578.

[51] Int. Cl.³ .............................................. C21D 8/00
[52] U.S. Cl. ..................................... 266/87; 266/129; 266/249; 266/115; 72/200; 72/202; 219/7.5; 148/154
[58] Field of Search ................. 266/104, 115, 129, 87; 219/7.5, 10.41, 10.57, 10.67, 10.69, 10.71; 148/150, 154; 72/200, 202

[56] References Cited

U.S. PATENT DOCUMENTS

3,610,315 10/1971 Juergens et al. ................. 164/76
3,715,556 2/1973 Balzer et al. ..................... 219/10.69
3,717,740 2/1973 Vickers ............................. 219/10.57

*Primary Examiner*—L. Dewayne Rutledge
*Assistant Examiner*—Christopher W. Brody
*Attorney, Agent, or Firm*—Bell, Seltzer, Park & Gibson

[57] ABSTRACT

This invention relates to a process and apparatus for hot working metals whereby a finer and more uniform grain structure is produced in the wrought product. In conventional hot working operations, the workpiece is initially heated to an elevated temperature within the hot working temperature range of the particular metal or alloy, and the heated workpiece is then hot worked by deformation until the workpiece becomes chilled, thereby necessitating reheating prior to further hot working. In accordance with the present invention, the reheating of the workpiece is accomplished by subjecting the chilled workpiece to electric induction heating at a frequency preselected to concentrate the induced heat in the chilled outer portions of the workpiece to thereby rapidly return the workpiece to the optimum hot working temperature throughout so that continued hot working can be reinitiated before appreciable grain growth can occur.

6 Claims, 10 Drawing Figures

Fig-1

Fig-2. GRAIN REFINEMENT VS. HOT WORK DEFORMATION & REHEATING USING CONDUCTION & RADIATION HEATING TO TEMPERATURE $T_O$

Fig-3. GRAIN REFINEMENT VS. HOT WORK DEFORMATION & REHEATING USING CONDUCTION & RADIATION HEATING TO TEMPERATURE $T_M$

Fig-4. GRAIN REFINEMENT VS. HOT WORK DEFORMATION & REHEATING USING INDUCTION REHEATING TO TEMPERATURE $T_O$

METHOD AND APPARATUS OF HOT WORKING METAL WITH INDUCTION REHEATING

This application is a division, of application Ser. No. 197,493, filed Oct. 16, 1980 now U.S. Pat. No. 4,362,578.

FIELD OF THE INVENTION

This invention relates to a method and apparatus for hot working metals and alloys, and more particularly relates to an improved method and apparatus for hot working by which a finer and more uniform grain structure is produced in the wrought product.

BACKGROUND OF THE INVENTION

Wrought billets of metals and alloys for use in redeformation applications are conventionally produced by a hot working operation in which cast ingots are heated in a fuel fired or electrically heated box furnace and the heated workpiece is deformed, as for example by forging or rolling, to refine, consolidate and homogenize the grain structure of the metal and while changing the shape of the product to one more suitable for subsequent redeformation applications.

The grain size reduction or refinement which is achieved during such a hot working operation imparts improved strength and uniformity to the product and enables it to withstand additional deformation operations with less cracking. Additionally, the capability for examining the product for internal flaws by nondestructive testing means is considerably enhanced in a finer grained structure as compared to that in a coarser grained product.

When the heated workpiece is removed from the heating furnace for deformation, it immediately begins to radiate heat, resulting in a rapid reduction of the surface temperature of the workpiece. When deformation is begun, the contact of the cooler forging dies or rolls further chills the outer portions of the workpiece as the work progresses. As a result of this heat loss, it is necessary to periodically interrupt the hot working operation and to reheat the workpiece to a suitable working temperature so that the hot working operation can be continued.

Many metals and alloys are characterized by a relatively narrow range of temperatures within which they can be worked without initiating internal or external cracks and voids which detract from or destroy the usefulness of the product and increase product costs due to the expense of removing such defects and the net loss of usable products. For such metals and alloys, the relatively narrow working temperature range considerably limits the amount of hot working which can be carried out before it is necessary to stop for reheating of the workpiece, and typically it is necessary for the workpiece to be reheated a number of times in carrying out the hot working operation and reducing the workpiece to the desired size and shape.

In conventional hot working operations, the workpiece is returned to the gas fired or electrically heated furnace for reheating. During this step, as the workpiece is reheated back to working temperature, the grain structure of the product coarsens, thereby negating a portion of all of the grain structure refinement achieved during the previous deformation step. Thus, during a hot working operation the grain refinement of the material proceeds stepwise, and the net grain refinement which is achieved is the sum of the differences between the refinement achieved during each deformation step and the grain size increase during the subsequent reheating step.

SUMMARY OF THE INVENTION

By the present invention, we have provided for obtaining a finer and more uniform grain structure in a workpiece which is being subjected to a hot working operation involving stepwise cycles of deforming the heated workpiece until it becomes chilled, and thereafter reheating the workpiece to the hot working temperature range so that the hot deformation can be continued. We achieve this by employing electric induction heating for the reheating of the workpiece back to a suitable hot working temperature. Through heating by electric induction, the workpiece is returned to the working temperature range much more quickly and efficiently than is possible with other conventional means of reheating. The rapid reheating of the workpiece achieved in accordance with the present invention permits continued hot working to be reinitiated before appreciable grain growth can occur, and as a result, the product obtained has a finer grain size and the uniformity of grain size throughout the workpiece is considerably enhanced.

The methods conventionally used for reheating, such as gas firing and electric radiation for example, apply all of their energy to the surface of the workpiece and must depend on the thermal conductivity of the metal for heating below the surface. This results in long heating cycles and poor efficiency. By induction heating, heat is generated inside the workpiece and it does not have to travel through the surface.

Furthermore, by using induction heating, we are able to direct the heat to those portions of the workpiece where heat is needed most. When the workpiece cools during hot working, the cooling is concentrated in a zone near the surface of the workpiece. The interior portions of the workpiece remain quite hot, even when the surface portions have cooled below the minimum hot working temperature. For example, tests conducted on nickel base alloy forging billets ranging in size from about 8 to about 20 inches in diameter showed that the primary chill depth for this type product occurs in a zone only about one-half to one inch deep at the surface. By appropriate selection of the induction heating frequency, the energy of the induction heating coil is concentrated in the chilled outer portions of the workpiece where the heating is needed most, and the workpiece is thus rapidly reheated to a substantially uniform hot working temperature throughout.

The particular induction heating frequency utilized depends on a number of factors, including the composition and size of the workpiece being reheated and the characteristics of the coil used. For example, for reheating forging billets of the above-noted type and size range, which we have determined to have a primary chill depth in a zone up to about one inch deep at the surface, an induction heating frequency within the range of 300 to 1000 Hz. is preferred. A frequency of about 700 Hz. concentrates about 80 to 85% of the electrical energy for heating in this one inch deep chill depth zone. Other types and sizes of workpiece may require a different frequency.

The present invention is generally applicable to all kinds of metals and alloys which are capable by being worked at elevated temperature by forging or rolling. However, the invention is especially advantageous and valuable for metals and alloys having a relatively narrow hot working temperature range, such as nickel base alloys for example.

The induction heating coil is designed to handle workpieces of a variety of different lengths. With this in mind, the coil is preferably mounted in a stationary position and the workpiece is moved through the coil, preferably in a reciprocating manner, until it is reheated to the desired temperature.

In accordance with one aspect of the invention, means can be provided for sensing the temperature of the workpiece as it is directed into the coil, and the electrical power input to the coil can be varied in accordance with the sensed temperature so as to vary the rate of heating along the length of the workpiece and thereby obtain a more uniform temperature profile along the length of the workpiece.

To add versatility in handling workpieces of various diameters, the reheating apparatus can be provided with several induction coils having different size openings therethrough, and the various coils can be moved as a unit so as to selectively position one of the coils for receiving the workpiece therethrough.

In a preferred form, the reheating apparatus is mounted adjacent to a forge press or rolling mill where the hot working operation is carried out, and the reheating apparatus comprises an induction coil having a central opening for receiving the workpiece therethrough, and with respective elongate support tables positioned on opposite sides of the coil and extending in axial alignment with the central opening in the coil for supporting the workpiece and guiding it through the coil. The support tables include means for longitudinally moving the workpiece back and forth in a reciprocating manner through the coil, and power supply means is provided for supplying electric current to the coil at a frequency preselected to concentrate the induced heat in the chilled outer portion of the workpiece. Preferably, the workpiece is reciprocated back and forth on the support tables by respective series of rollers mounted in the support tables for supporting the workpiece thereon, with means being provided for rotating the rollers in unison first in one direction and then in the opposite direction so as to thereby impart reciprocating movement to the workpiece. Means may be provided in association with one of the support tables for moving the support table away from the coil and into close proximity with the forge press or rolling mill so as to thereby convey the workpiece between the induction coil for reheating and the forge press or rolling mill for hot working.

BRIEF DESCRIPTION OF THE DRAWINGS

Some of the features and advantages of the invention having been described, others will become apparent as the description proceeds when taken in connection with the accompanying drawings, in which—

GRAIN GROWTH IN METALS AND ALLOYS

In order to better understand the present invention and how a finer and more uniform grain structure is achieved in accordance with the method and apparatus of this invention, a brief explanation of grain growth phenemona is believed to be helpful.

At the outset, it should be noted that for simplicity and to avoid wordiness, the term "metal," unless otherwise herein indicated, is used in this specification and in the appended claims in a generic sense and is intended to include both pure metals formed from a single chemical element as well as alloys.

The rate of grain growth in metals is a function of both the temperature of the material and the time at temperature, as well as the grain size and grain nucleation of the material. From this functional relationship, it can be seen that:

a small average grain diameter material has a faster growth rate than does a coarser grained material;

growth rates are greater for higher temperatures; and a definite time is required for recrystalization to occur and for the average grain size of a material to grow and reach equilibrium with its temperature and work history.

Figure 1:
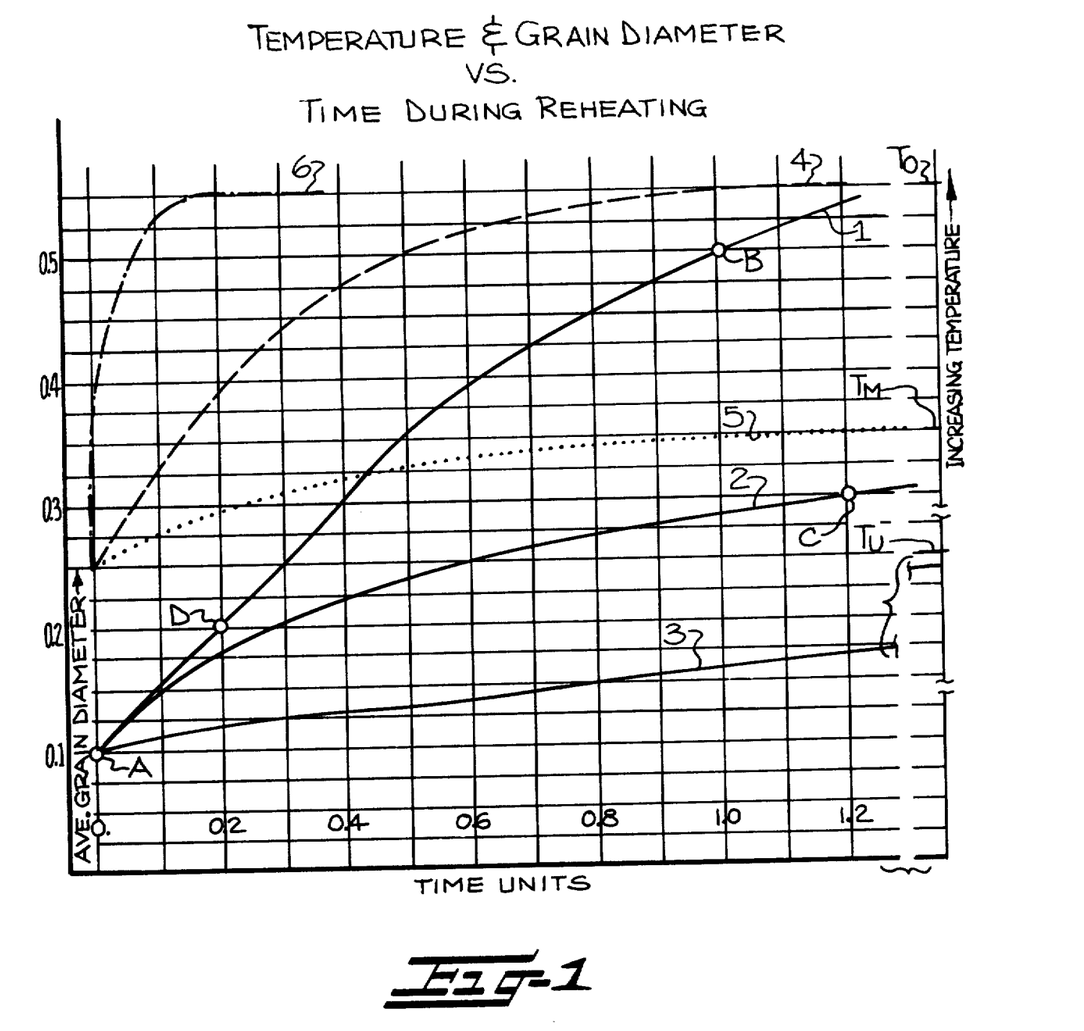
FIG. 1 is a graph illustrating the relationship of temperature and grain diameter to time during reheating.

These relationships are presented in a generalized fashion in FIG. 1 by the curves labeled 1, 2 and 3. Curve 1 in FIG. 1 depects the grain sizes versus time relationship of a metal being reheated to an optimum working temperature, $T_o$. The growth rate is fairly rapid with time at first, and then decreases as the material approaches the temperature $T_o$. In curve 2, where the material is being heated to a lower temperature, $T_m$, representing the minimum practical working temperature, and the growth rate is slower with time. Likewise, in curve 3, where the material is being heated to a temperature $T_u$, where workability is unsatisfactory, the growth rate is even slower.

Curve 4 in FIG. 1 represents the relationship of material temperature versus time during reheating in a fuel fired atmospheric furnace from an unsatisfactory working temperature $T_u$ to an optimum working temperature $T_o$. The vertical distance between curve 4 and curve 1 is a qualitative measure of the lag between grain size equilibrium and the time-temperature state of the material being heated. Point B on curve 1 represents the grain size of material after being reheated to the optimum working temperature $T_o$, in a fuel fired furnace.

Similarly, curve 5 represents the time-temperature relationship during reheating in a fuel fired furnace from temperature $T_u$ to the temperature of minimum practical workability $T_m$. Curve 2 depicts the grain size versus time state of the material being heated in curve 5. The grain size of material reheated to $T_m$ is represented as point C on curve 2 and is substantially finer than the comparable point B on curve 1. While the low grain growth rate depicted in curve 3 is desirable, the workability of the material at $T_u$ is unsatisfactory.

Curve 6 in FIG. 1 depicts the rapid heating with time which occurs during electric induction reheating to temperature $T_o$. Because of the substantially shorter heating time to $T_o$, the grain size during the reheating step will only increase from point A to point D on curve 1, as compared to the grain size at point B on curve 1 for reheating to the same optimum temperature in a fuel fired furnace.

Figure 2:
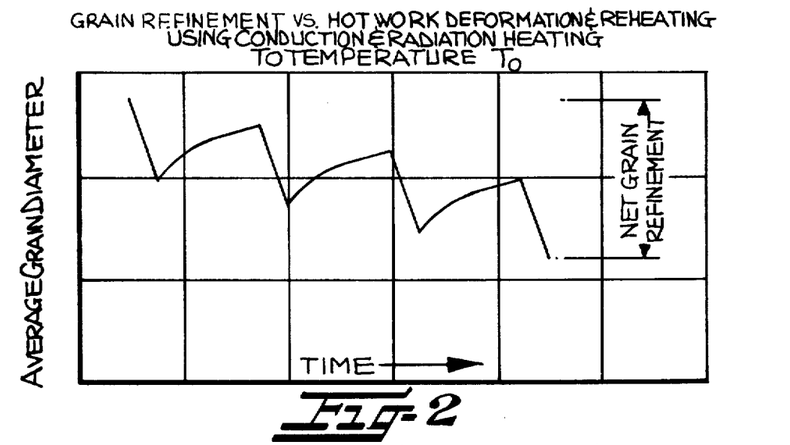
FIG. 2 is a graph illustrating the relationship of grain refinement to hot work deformation and reheating using conventional conduction and radiation heating to an optimum hot working temperature.

In FIG. 2, the accumulated grain refinement for multiple deformation reheat cycles is depicted for material being processed from optimum temperature $T_o$ using conduction and radiation reheating achieved by a conventional fuel fired furnace. An increment of grain refinement is achieved in the workable temperature range of the material by deformation, as indicated by the downwardly sloping portions of the graph, and then the material is reheated back to working temperature and grain coarsening occurs, as seen by the upwardly sloping portions of the graph. A net grain refinement in the ending product size is achieved after a number of deformation-reheat cycles.

Figure 3:
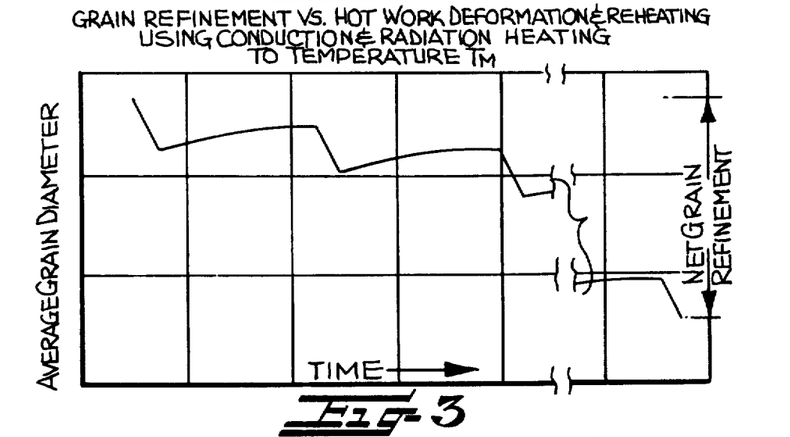
FIG. 3 is a graph similar to FIG. 2 but wherein the workpiece is heated to a minimum hot working temperature.

FIG. 3 is similar to FIG. 2 but shows the refinement achieved using a minimum reheating temperature $T_m$. Because of the reduced temperature, smaller deformation increments must be used; thus, more reheats are necessary to produce the same final product size as was produced in the example of FIG. 2. With the lower reheating temperature, less grain growth occurs during each reheat and therefore a greater net refinement is accumulated at the final product size than in the example of FIG. 2. This greater refinement is achieved at the expense of reduced productivity and increased fuel cost because of the smaller reduction increments and the greater number of reheats required to produce the final size.

Figure 4:
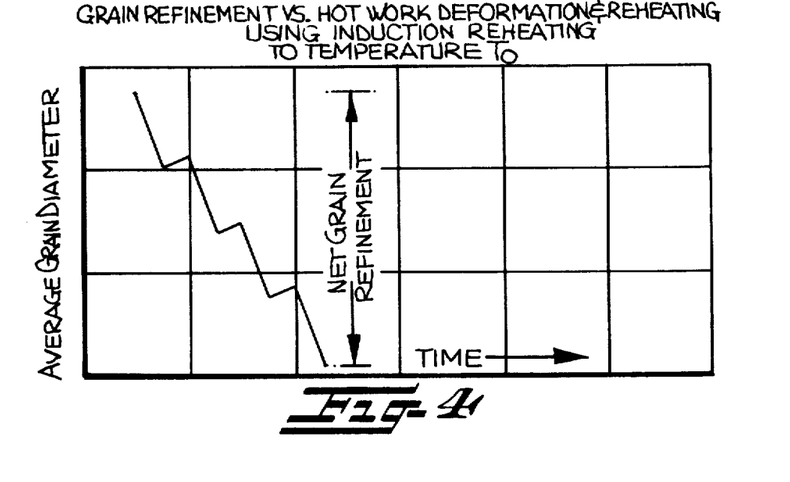
FIG. 4 is a graph similar to FIGS. 2 and 3 showing the relationship of grain refinement to hot work deformation and reheating using the induction reheating practice of this invention for reheating the workpiece to an optimum hot working temperature.

FIG. 4 illustrates the accumulated grain refinement for multiple deformation reheat cycles in accordance with the invention where induction reheating is utilized to reheat the material to the optimum working temperature $T_o$. The deformation increments and the resulting grain refinement in each deformation step are the same as in the example of FIG. 2. However, the grain coarsening during each reheat increment is considerably smaller than for either the example in FIG. 3 or FIG. 2, and consequently, the net refinement achieved is greater than the examples in either FIG. 2 or FIG. 3. Additionally, with the more rapid heating achieved by the induction reheated material, productivity is increased. Heating energy costs are also reduced because of the higher energy transfer efficiency provided by the induction heating process as compared to that which is characteristic of fuel fired atmospheric furnaces.

In practice, two additional benefits of the induction reheating method have been observed. First, when using a forging press to perform the deformation, surface chilling inherently occurs due to the contact of the relatively colder dies and the hot metal being worked. This chilling will reduce the surface layers of the material below the minimum working temperature $T_m$ into the region of unsatisfactory working temperatures and a thin layer of the surface will crack. Cracking during hot working is usually intergranular in nature and once initiated, will propagate easily along the grain boundary between two grains until it reaches the intersection of that grain boundary with those formed by a third grain lying in contact with the initial two grains. More energy must then accumulate before the crack will continue along the boundaries formed by the new grain pairs. With the smaller average grain size achieved in the induction reheating practice at any point in the accumulated reduction, the average length of grain pair boundaries is smaller than for the same point in the process using fuel fired furnace reheating as depicted in FIG. 2. Hence, the total accumulated depth of distressed material for a given total reduction is reduced. In the example of FIG. 3, the average grain boundary length is less than in the example of FIG. 2. However, the increased number of reduction increments and the closer proximity of the minimum working temperature to the unsatisfactory temperature, $T_u$, in practice creates many more opportunities for cracking to occur and results in more total distress accumulation than under the conditions of FIG. 2 or FIG. 4.

Second, in addition to the finer overall grain size associated with the induction reheating practices, the grain size near the surface of the billet is especially improved as compared to material processed by fuel fired reheating. As noted earlier, during a forging operation, the radiation heat loss from the workpiece and the cooling effect of the forging dies result in the outer portion of the workpiece becoming chilled. Tests have indicated that the typical chill depth occurs in a band up to about one inch deep at the surface of the workpiece, and that about the same chill depth occurs in the various diameters of workpieces undergoing forging. This outer chilled layer of material stiffens significantly as compared to the hotter material in the core of the billet, and forces much of the deformation to occur in the hotter material. Grain nucleation increases with increased deformation. The core of the billet thus has ample grain nucleation for a normal competitive recrystalization and growth process to occur. The chilled surface portions, having a relatively small actual deformation, have less grain nucleation and when recrystallization occurs during reheating these grains will grow in a more noncompetitive fashion, achieving a larger average diameter than those in the billet core. In fuel fired reheating, this process is allowed to go to a greater degree of completion than is permitted in the shorter induction reheating process.

The induction reheating practices of the present invention and the advantages of the present invention over conventional rehetaing practices are illustrated by the following example, which is not to be understood as limiting the scope of the invention.

ILLUSTRATIVE EXAMPLE

Wrought billets of three different alloys were produced by forging using the induction reheating practices of this invention. Large workpieces of the alloys were initially heated in a gas fired box furnace to an optimum hot working temperature of about 1950° F. to 2050° F. depending upon the particular alloy. The workpieces were then subjected to forging in a forge press to produce wrought billets of the diameter indicated in Table 1. In reducing the billets to the final product diameters indicated, multiple deformation and reheat cycles were required. Each reheat was accomplished by indication heating at a frequency of about 700 Hz. in an apparatus similar to that illustrated in FIG. 9. For purposes of comparison, wrought billets of the same alloys were also produced by similar forging techniques but with conventional reheating in a fuel fired furnace. The billets were evaluated by sonic inspection, and grain size evaluations were made from samples taken both at the surface and at the center of the billet. Table 1 summarizes the results of these evaluations.

TABLE 1

Ultrasonic Inspection and Grain Size Comparisons of Fuel Fired Furnace Reheat Processing to Induction Reheat Processing

| Alloy | Product Size (Dia.) | Reheat Process | Sonic Back Refl. | Sonic Noise (%) | ASTM Grain Size* | |
|---|---|---|---|---|---|---|
| | | | | | Surface | Center |
| 718 | 8" | Induction | 6–8 | 5 | 6–8 w/o 5 | 5–8 |
| 718 | 8" | Fuel Fired | 2–8 | 0–30 | 0–3 w/o 00 | 7–8 d 1–3 |
| 718 | 12" | Induction | 3–8 | 0 | 4–5 | 5–6 |
| 718 | 12" | Induction | 3–8 | 0–15 | 5–6 | 5.5–7 |
| 718 | 12" | Fuel Fired | 3–6 | 0–10 | 2–5 w/o 1 | 3–6 w/o 2 |
| Rene' 41 | 9" | Induction | 4–8 | 0 | 5–8 w/o 3,4 | 5–8 |
| Rene' 41 | 9" | Fuel Fired | 3–5 | 0 | 2–5 w/o 0,1 | 2–5 w/o 1 |
| Waspaloy | 13" | Induction | 1½–4 | 10–15 | 2–3 | 1½–4 |
| Waspaloy | 13" | Induction | 1½–7 | 0–20 | 1½–4 | 1½–2½ |
| Waspaloy | 14" | Fuel Fired | 1–3½ | 0–35 | 1–3 w/o 0 | 1–3 d 6–7 |

*Abbreviations: w/o = with occasional, d = duplexed with

Good sonic inspection is characterized by a high number of back reflections and low levels of background indications called "noise," expressed as a percent of the height of the indication from the flat bottomed hole standard used to calibrate the inspection equipment. The ultrasonic inspection results showed that the induction reheated products generally give more back reflections and exhibit less noise than the comparable material processed from fuel fired reheat furnaces. Grain size results also show smaller grain size (larger ASTM number) and more uniform grain size than for the fuel fired reheat materials. The surface grain size is especially improved in the induction reheated material.

FIGS. 5–8 are photomicrographs showing the comparative grain size from samples of an eight inch diameter billet of alloy 718, processed by the induction reheating procedure of this invention and by conventional convection and radiation reheating in a fuel fired box furnace. The sonic inspection and grain size data for the samples shown in these photomicrographs are set forth in the first two lines of Table 1.

Figure 5:
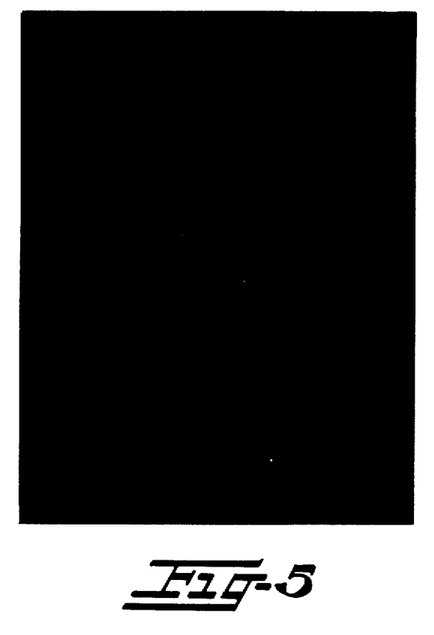
FIGS. 5 and 7 are photomicrographs showing the grain structure of a workpiece processed by the induction reheating procedures of this invention, the samples taken respectively at the surface and at the center of the workpiece.
Figure 6:
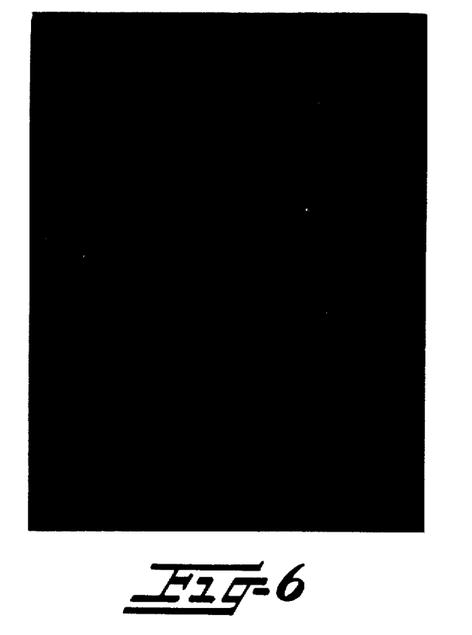
FIGS. 6 and 8 are photomicrographs showing the comparative grain structure of a workpiece processed by conventional conduction and radiation reheating procedures, the samples taken respectively at the surface and at the center of the workpiece.

FIG. 5 illustrates the surface grain size of an induction reheat processed billet, while FIG. 6 illustrates the surface grain size of a comparable billet processed by conventional reheating.

Figure 7:
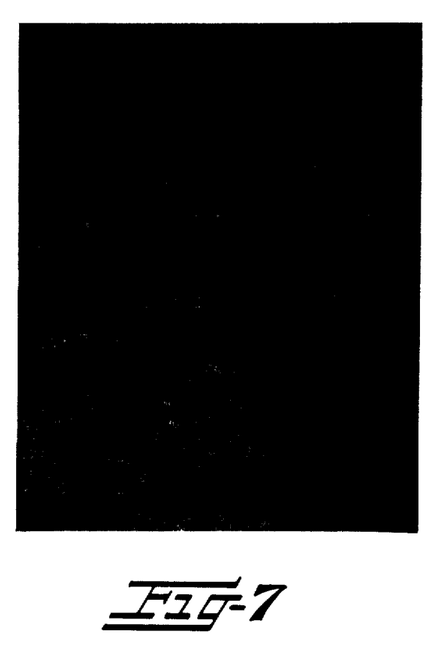
Figure 8:
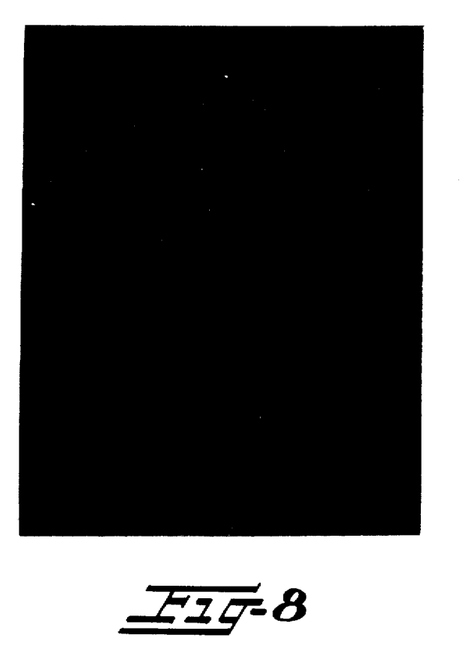

FIG. 7 shows the center grain size of the induction reheat processed billet, while FIG. 8 shows a sample from a corresponding location in a billet processed by conventional reheating. The induction reheated sample has a uniform grain size of from about 5 to 8 ASTM grain size, while the conventionally reheated sample exhibits considerable nonuniformity of grain size, with the grain size ranging from ASTM 7 to 8 duplexed with larger grains of ASTM 1 to 3.

INDUCTION REHEATING APPARATUS

Figures 9, 10:
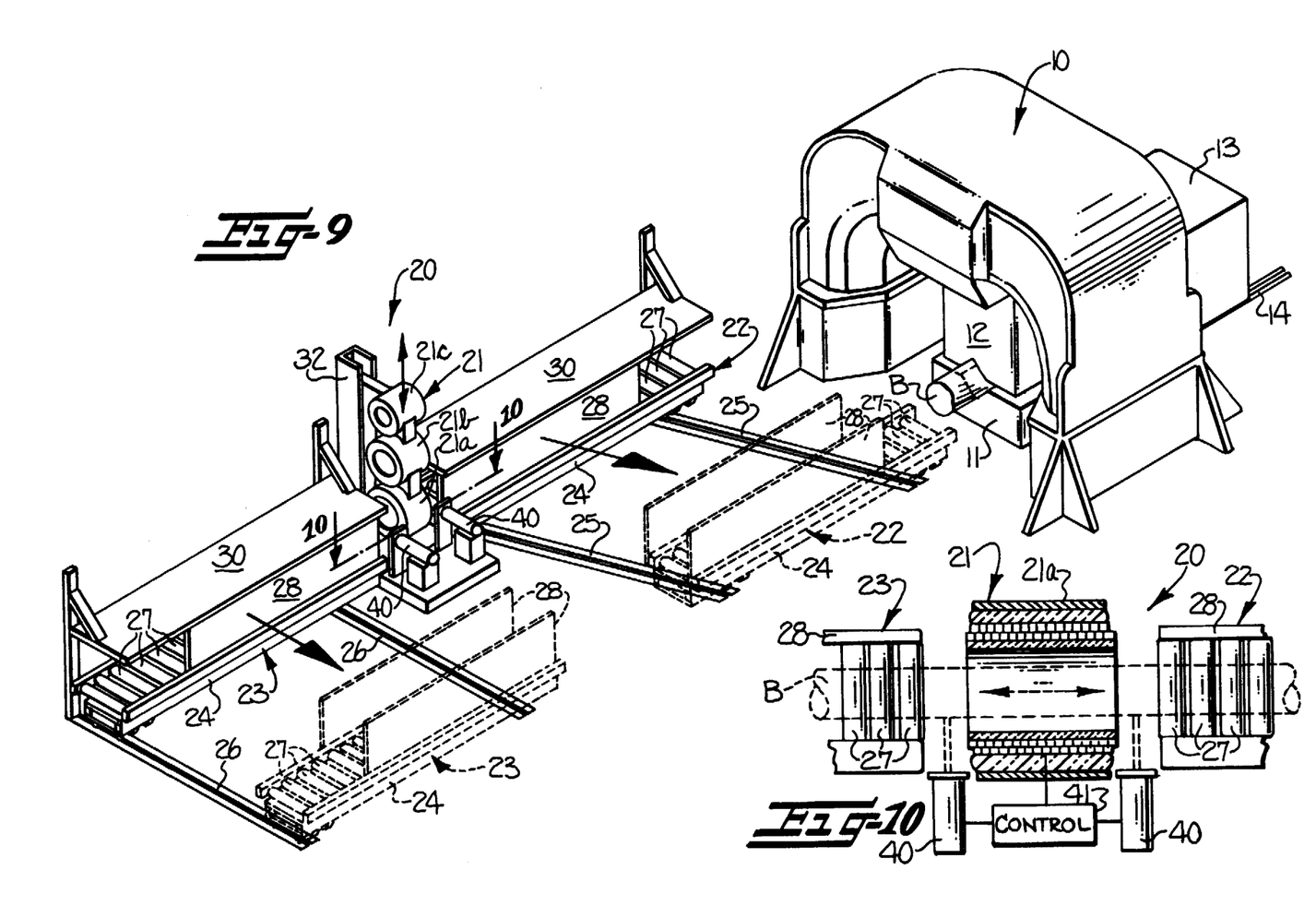
FIG. 9 is a schematic perspective view showing an arrangement of apparatus in accordance with this invention.
FIG. 10 is a fragmentary sectional view of the induction coil taken substantially along the line 10—10 of FIG. 9.

A suitable apparatus for carrying out the induction reheating practices of the present invention is illustrated in FIG. 9. This arrangement of apparatus is designed for carrying out the induction reheating practices of the present invention in conjunction with the hot working of billets on a forge press. Those skilled in the art will appreciate that other applications of the induction reheating practices of this invention may require different arrangements of apparatus.

The forge press is indicated generally by the reference character 10 and includes a pair of dies 11, 12 between which a heated billet B is being worked so as to reduce the billet B in cross-section while refining and homogenizing the grain structure thereof. A manipulator 13 is located on one side of the forge press and mounted on tracks 14 for movement toward and away from the dies 11, 12. The manipulator 13 is constructed for grasping and holding the heated billet and progressively advancing the billet longitudinally through the forge press as the billet is being worked and being reduced by the cooperating dies. Typically, the billet B is initially heated in a gas fired or electrically heated box furnace (not shown), and then removed from the box furnace and placed in the manipulator 13. The billet is then hot worked by the forge press 10 until the billet cools to a temperature close to the minimum hot working temperature. At this point, reheating of the billet is necessary and the billet is transferred to the induction reheating apparatus of the present invention.

The induction reheating apparatus is generally indicated by the reference character 20 and is located closely adjacent the forge press 10 for receiving the billet from the forge press and reheating the billet to the optimum hot working temperature. The induction reheating apparatus 20 includes an induction coil assembly 21 and a pair of support tables 22, 23 located on opposite sides of the induction coil assembly and constructed for supporting the billet B and advancing it back and forth in a reciprocating manner through the induction coil. The support tables 22, 23 each include a supporting carriage or base 24 having wheels mounted for movement in respective trackways 25, 26 for purposes which will become apparent as the description proceeds. The carriage 24 of each support table 22, 23 supports a series of rollers 27 which are mounted for rotation on respective horizontally extending axes and which are adapted for supporting and conveying the billet thereon. Suitable drive means are associated with the respective rollers 27 of each table 22, 23 for rotating the rollers in unison movement first in one direction and then in the opposite direction for thereby conveying the billet longitudinally back and forth along the tables 22, 23 and through the induction coil. Insulated side walls 28 are provided along opposite sides of the respective support tables for guiding the billet in its longitudinal path of travel and for also assisting in reducing radiation heat loss from the billet. An insulated upper wall 30 is stationarily mounted above the side walls to further assist in reducing radiation heat loss from the billet.

As illustrated, the induction coil assembly 21 preferably comprises several individual induction coils (21a, 21b, 21c) of differing diameters to facilitate accommodating a wide range of workpiece sizes. The respective individual coils are mounted together for movement as a unit, and supported by an upright supporting column 32. Suitable drive means is provided for moving the coil assembly 21 up or down to selectively position any one of the individual coils 21a, 21b, 21c at the level of the supporting tables 22, 23 and in alignment with the path of travel of the billet for receiving the billet through the coil.

As previously noted, the support tables 22, 23 are each mounted for movement in individual trackways 25, 26 respectively. When reheating of the billet B is needed, the support table 22 is moved along the trackways 25 from the position shown in solid lines where the support table is in longitudinal alignment with the coil assembly 21 to the position shown in broken lines where the support table is in longitudinal alignment with the billet located in the dies 11, 12 of the forge press. With the dies 11, 12 released, the manipulator 13 advances the billet longitudinally and positions it on the support table 22. The support table 22 is then returned to the position shown in solid lines where the reheating of the billet is carried out, after which the billet is conveyed back to the forge press for further hot working.

The support table 23 can similarly be moved from the position shown in solid lines to the position shown in broken lines, when necessary, to provide access to the coil assembly for servicing or to otherwise facilitate loading or unloading billets in the induction reheating apparatus.

In many instances, the billet B undergoing reheating may have an uneven temperature distribution along its length. Typically, for example, one end of the billet is cooler than the remainder of the length of the billet as a result of conduction heat losses where the end of the billet is grasped by the manipulator 13. A particularly advantageous feature of the present invention is the ability to vary the heat input along the length of the workpiece so as to thereby obtain a more uniform temperature of the workpiece during reheating. As best seen in FIG. 10, a radiation temperature sensor 40 is located on each side of the coil. The radiation temperature sensors 40 are electrically connected to a control mechanism, schematically indicated at 41, which in turn controls the electrical power input to the particular induction heating coil 21a, 21b or 21c being used. As the billet advances longitudinally toward and through the coil, the radiation temperature sensor located on the entry side of the coil continuously senses the temperature of the billet at all points along its length and transmits this information to the control mechanism 41 which, in turn, varies the electric power input to the coil. A characteristic feature of induction coils is that there is a finite lag time, known as "ramp-up time" between the time the electric power input to the coil is increased and the time when that increase is realized by the coil in terms of increased heating of the workpiece. This lag time or "ramp-up time" is correlated with the speed of travel of the billet through the coil so that when the temperature sensor 40 senses the temperature at a particular point along the length of the workpiece and orders an increase in power input to the coil, that same point on the billet will have moved within the coil by the time the coil has realized the increased power input and achieved a higher heating rate. Thus, by this arrangement, significantly enhanced uniformity of temperature can be achieved at all points along the length of the workpiece and the uniformity and quality of the hot working is thus significantly enhanced.

While this invention has been described fully and completely with reference to certain specific illustrative embodiments as required by the patent laws, it must be understood that within the scope of the appended claims this invention may be practiced otherwise than as specifically described herein.

What is claimed is:

1. In an apparatus for hot working a workpiece formed of a metal having an optimum hot working temperature range, said apparatus comprising means for initially heating the workpiece to a temperature within said working temperature range and means for receiving the heated workpiece and for hot working the workpiece by deformation until the workpiece becomes chilled, thereby necessitating reheating prior to further hot working, the combination with said apparatus of an improved means for reheating the chilled workpiece to produce a finer and more uniform grain structure in the workpiece, said means for reheating comprising an electric induction heating coil having a central opening for receiving the workpiece therethrough, respective elongate support tables positioned on opposite sides of said coil and extending in axial alignment with the central opening in said coil for supporting the workpiece and guiding the same through the coil, said support tables including means for longitudinally moving the workpiece back and forth in a reciprocating manner through said coil, means associated with one of said elongate support tables for moving the support table away from said coil and into close proximity with said means for hot working the workpiece so as to thereby convey the workpiece between said induction coil for reheating and said hot working means for hot working, and power supply means for supplying electric current to said coil at a frequency preselected to concentrate the induced heat in the chilled outer portions of the workpiece to rapidly return the workpiece to a substantially uniform hot working temperature throughout so that continued hot working can be reinitiated before appreciable grain growth can occur.

2. An apparatus for rapidly reheating to an optimum hot working temperature a workpiece formed of a metal having a predetermined optimum hot working temperature range; said apparatus comprising an electric induction heating coil having a central opening for receiving the workpiece therethrough, respective elongate support tables positioned on opposite sides of said coil and extending in axial alignment with the central opening in said coil for supporting the workpiece and guiding the same through the coil, said support tables including means for longitudinally moving the workpiece back and forth in a reciprocating manner through said coil, power supply means for supplying electric current to said coil at a frequency preselected to concentrate the induced heat in the chilled outer portions of the workpiece to rapidly return the workpiece to a substantially uniform hot working temperature throughout so that continued hot working can be reinitiated before appreciable grain growth can occur, temperature sensing means for sensing the temperature of the workpiece as it enters said coil and means cooperating with said temperature sensing means and with said power supply means for varying the electrical power input to the coil in accordance with the sensed temperature of the workpiece to thereby vary the rate of heating along the length of the workpiece to obtain a more uniform temperature along the length of the workpiece.

3. An apparatus as set forth in claim 1 or 2 wherein said means for longitudinally moving the workpiece back and forth in a reciprocating manner through the coil comprises a respective series of rollers mounted in each of said support tables for supporting the workpiece thereon, and means for rotating the rollers in unison, first in one direction and then in the opposite direction, for thereby imparting reciprocating movement to the workpiece.

4. An apparatus as set forth in claim 1 further including means for measuring the temperature of the workpiece as it enters said coil and means cooperating with said power supply means for varying the electrical power input to the coil in accordance with the sensed temperature of the workpiece to thereby vary the rate of heating along the length of the workpiece to obtain a more uniform temperature along the length of the workpiece.

5. An apparatus as set forth in claim 1 or 2 including at least one additional induction coil having a central opening of a predetermined size different from the central opening of said first mentioned induction coil and adapted for receiving a workpiece of a different cross-sectional size, means for mounting said at least one additional induction coil alongside said first mentioned induction coil to form an assembly of induction coils movable as a unit, and means for moving said assembly of induction coils so as to permit selectively positioning any one of the induction coils in axial alignment with said support tables for receiving a workpiece therethrough.

6. An apparatus for rapidly reheating to an optimum hot working temperature a workpiece formed of a metal having a predetermined optimum hot working temperature range; said apparatus comprising electric induction heating means having a central opening for receiving the workpiece therethrough, respective elongate support tables positioned on opposite sides of said heating means and extending in axial alignment with the central opening thereof for supporting the workpiece and adding the same through the heating means, said support tables including means for longitudinally moving the workpiece back and forth in a reciprocating manner through said heating means, said heating means including a plurality of induction coils each having a central opening of a predetermined size different from the central opening of the other coils, and each being adapted for receiving therethrough a workpiece of a different cross-sectional size, means for mounting said coils together as an assembly movable as a unit, means for moving said assembly of induction coils so as to permit positioning a selected one of the induction coils in axial alignment with said support tables for receiving a workpiece therethrough, and power supply means operatively connected to said selected one of the induction coils for supplying electric current thereto at a frequency preselected to concentrate the induced heat in the chilled outer portions of the workpiece to rapidly return the workpiece to a substantially uniform hot working temperature throughout so that continued hot working can be reinitiated before appreciable grain growth can occur.

* * * * *